US009169719B2

(12) United States Patent
McMillon et al.

(10) Patent No.: US 9,169,719 B2
(45) Date of Patent: *Oct. 27, 2015

(54) DOWNHOLE SUPERCAPACITOR DEVICE

(71) Applicant: Halliburton Energy Services, Inc., Houston, TX (US)

(72) Inventors: Christopher M. McMillon, Wylie, TX (US); Robert M. Neely, Dallas, TX (US); Gregory T. Werkheiser, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,842

(22) Filed: Sep. 24, 2014

(65) Prior Publication Data

US 2015/0047844 A1 Feb. 19, 2015

Related U.S. Application Data

(60) Division of application No. 14/142,167, filed on Dec. 27, 2013, now Pat. No. 8,881,832, which is a continuation of application No. PCT/US2013/020100, filed on Jan. 3, 2013.

(51) Int. Cl.
*E21B 43/1185* (2006.01)
*E21B 41/00* (2006.01)
(Continued)

(52) U.S. Cl.
CPC ........... *E21B 41/0085* (2013.01); *E21B 17/028* (2013.01); *E21B 23/00* (2013.01);
(Continued)

(58) Field of Classification Search
CPC E21B 31/007; E21B 41/0085; E21B 43/1185
See application file for complete search history.

(56) References Cited

U.S. PATENT DOCUMENTS 2,059,488 A 11/1936 Prikel
2,154,654 A 4/1939 Armentrout et al.
(Continued)

FOREIGN PATENT DOCUMENTS

CN 102057456 5/2011
WO 2007125282 2/2008

OTHER PUBLICATIONS

Gould, "Supercapacitors as a Power Supply for Resistance Welding?, retrieved from http://ewi.org/supercapacitors-as-a-power-supply-for-resistance-welding", Apr. 6, 2012, 3 pages.
(Continued)

*Primary Examiner* — David Andrews
(74) *Attorney, Agent, or Firm* — Kilpatrick Townsend & Stockton LLP

(57) ABSTRACT

Certain aspects and features of the present invention are directed to a supercapacitor device that can be disposed in a wellbore through a fluid-producing formation. The supercapacitor device can include a body that can be disposed in the wellbore, a supercapacitor disposed in the body, at least two terminals disposed at least partially outside the body, and an actuation mechanism. The supercapacitor stores energy. The terminals can be electrically connected with the supercapacitor. An electrical connection between the supercapacitor and the terminals can cause the energy to be discharged from the supercapacitor in response to a conductive material providing an electrical path between the at least two terminals. The actuation mechanism can selectively prevent a deployment of the supercapacitor device in the wellbore from causing a discharge of the energy from the supercapacitor.

20 Claims, 13 Drawing Sheets

(51) Int. Cl.
  *E21B 23/00* (2006.01)
  *E21B 17/02* (2006.01)
  *E21B 43/11* (2006.01)
  *H01H 3/26* (2006.01)
  *H01H 35/24* (2006.01)
  *H01G 11/08* (2013.01)
  *H01G 11/16* (2013.01)

(52) U.S. Cl.
  CPC ............ *E21B 43/11* (2013.01); *E21B 43/1185* (2013.01); *H01H 3/26* (2013.01); *H01H 35/24* (2013.01); *H01G 11/08* (2013.01); *H01G 11/16* (2013.01)

(56) References Cited

U.S. PATENT DOCUMENTS

| | | | |
|---|---|---|---|
| 6,303,894 | B1 | 10/2001 | Laser et al. |
| 7,203,056 | B2 | 4/2007 | Thrap |
| 7,312,976 | B2 | 12/2007 | Kazaryan et al. |
| 7,983,021 | B2 | 7/2011 | Reddy et al. |
| 2003/0048697 | A1 | 3/2003 | Hirsch et al. |
| 2007/0181547 | A1 | 8/2007 | Vogel et al. |
| 2008/0223584 | A1 | 9/2008 | Chavers |
| 2008/0272092 | A1 | 11/2008 | Luthardt et al. |
| 2010/0236777 | A1 | 9/2010 | Partouche et al. |
| 2010/0259866 | A1 | 10/2010 | Shaffer et al. |
| 2011/0210645 | A1 | 9/2011 | Mason |
| 2012/0168226 | A1 | 7/2012 | Brooks et al. |

OTHER PUBLICATIONS

International Patent Application No. PCT/US2013/020100, "International Search Report and Written Opinion", mailed Oct. 7, 2013, 13 pages.

U.S. Appl. No. 14/142,167, Notice of Allowance mailed on Jul. 7, 2014, 7 pages.

U.S. Appl. No. 14/142,167, Supplemental Notice of Allowability mailed on Sep. 2, 2014, 4 pages.

U.S. Appl. No. 14/494,748, Non-Final Office Action mailed Mar. 11, 2015, 11 pages.

DOWNHOLE SUPERCAPACITOR DEVICE

CROSS-REFERENCE TO RELATED APPLICATIONS

This is a divisional of U.S. patent application Ser. No. 14/142,167, filed Dec. 27, 2013, which is a continuation of PCT/US2013/020100, filed Jan. 3, 2013, the entirety of both which are incorporated herein by reference.

TECHNICAL FIELD OF THE INVENTION

The present invention relates generally to devices for deploying tools in a wellbore in a subterranean formation and, more particularly (although not necessarily exclusively), to a downhole device including one or more supercapacitors used to transfer electrical or thermal power to downhole materials in a well system.

BACKGROUND

A well system, such as an oil or gas well for extracting fluids that can include petroleum oil hydrocarbons from a subterranean formation, can include structures or tools that require cutting to prepare the well for the production of petroleum oil hydrocarbons or other production fluids. In one example, an opening can be cut into a vertical section of a tubing string of the well system in order to add a horizontal section to the tubing string. In another example, a tubing string can be perforated by a group of perforating guns to allow the flow of fluid into the tubing string from the formation. Downhole structures or tools, such as tubing sections, can be formed from materials that are resistant to high temperature or pressure. Cutting tools deploying in a downhole environment can require a relatively large amount of energy to cut the downhole structures or tools. For example, a welding tool deployed in a well system may require a relatively cumbersome energy storage system or an additional power line to be deployed into the well system with the welding system.

It is desirable to provide a compact downhole tools for applying a high amount of energy to downhole tools and structures.

SUMMARY

In one aspect, a supercapacitor device is provided that can be disposed in a wellbore through a fluid-producing formation. The supercapacitor device can include a body that can be disposed in the wellbore, at least one supercapacitor disposed in the body, at least two terminals disposed at least partially outside the body, and an actuation mechanism. The supercapacitor can store energy. The at least two terminals can be electrically connected with the supercapacitor. An electrical connection between the supercapacitor and the at least two terminals can cause the energy to be discharged from the supercapacitor in response to a conductive material providing an electrical path between the at least two terminals. The actuation mechanism can selectively prevent a deployment of the supercapacitor device in the wellbore from causing a discharge of the energy from the supercapacitor.

In another aspect, a method is provided. The method involves deploying a supercapacitor device in a wellbore through a fluid-producing formation. The supercapacitor device includes at least one supercapacitor configured to store energy, at least two terminals, and an actuation mechanism. The actuation mechanism can selectively prevent a deployment of the supercapacitor device in the wellbore from causing a discharge of the energy from the supercapacitor. The method also involves positioning the supercapacitor device such that the at least two terminals are in contact with a conductive material in the wellbore. The method also involves discharging the energy from the supercapacitor by actuating the actuation mechanism.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
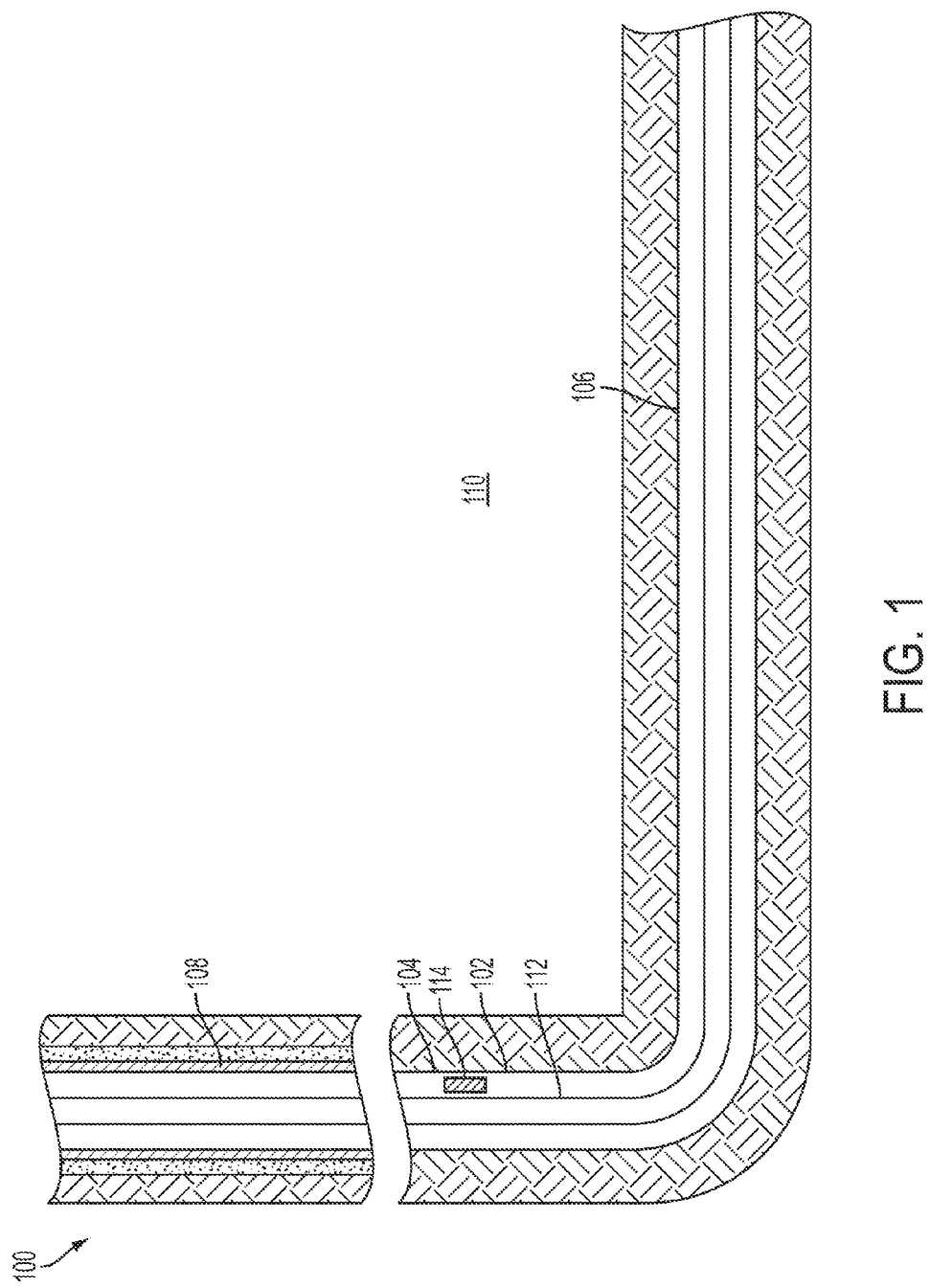
FIG. 1 is a schematic illustration of a well system in which a supercapacitor device can be disposed according to one aspect of the present invention.

Certain aspects and features of the present invention are directed to a supercapacitor device configured to be deployed downhole in a well system. The supercapacitor device can include at least one supercapacitor (also known as an electric double-layer capacitor, electrochemical double layer capacitor, or ultracapacitor) with a relatively high energy density for storing electrical or thermal power that can be released and applied to downhole materials, structures, tools, etc. The stored energy can be rapidly discharged by positioning the supercapacitor in contact with a conductive material in a wellbore, such as a metallic object. For example, the energy can be discharged by short-circuiting a supercapacitor using the conductive material.

The superconductor device can provide a compact energy storage solution for deployment in a downhole environment. The supercapacitor device can be used as a downhole welding device to weld, cut, or join two pieces of conductive material. The supercapacitor device can also be used as a downhole retrieval device that can be fused to an object downhole.

The supercapacitor device can also include an actuation mechanism for preventing a premature discharge of the supercapacitor caused by a deployment of the supercapacitor device in the wellbore from causing. For example, the actuation mechanism can include a non-conductive material that wholly or partially surrounds the terminals of the supercapacitor device. The non-conductive material can prevent an electrical path from being formed between the terminals. The actuation mechanism can also include a mechanism for displacing the non-conductive material after the supercapacitor is deployed to a desired position in the wellbore.

The supercapacitor device can be used for any suitable application involving the discharge of heat energy or electrical current. In some aspects, the supercapacitor device can be used as a retrieval tool for retrieving an object from a wellbore by fusing the object to the supercapacitor device via a conductive material melted by discharging the supercapacitor. In other aspects, the supercapacitor device can be used to cut a perforation in a vertical section of the tubing string to allow for drilling in a horizontal direction or to sever a section of the tubing string for retrieval. In another non-limiting example, the supercapacitor device can be used to melt or cut a perforation into a disc, thereby allowing rupture discs configured to withstand relatively low pressure (such as rubber or plastic rupture discs) to be replaced with a metal disc configured to withstand higher pressures at greater depths in the well system. In other aspects, the supercapacitor device can be used to charge a downhole battery. In other aspects, the supercapacitor device can be used to detonate a detonating material of a gun assembly for perforating a tubing string.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "above," "below," "upper," "lower," "upward," "downward," "left," "right," "uphole," "downhole," etc. in relation to the illustrative aspects as they are depicted in the figures, the upward direction being toward the top of the corresponding figure and the downward direction being toward the bottom of the corresponding figure, the uphole direction being toward the surface of the well and the downhole direction being toward the toe of the well. Like the illustrative aspects, the numerals and directional descriptions included in the following sections should not be used to limit the present invention.

FIG. 1 schematically depicts a well system 100 in which a supercapacitor device can be deployed. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. In some aspects, a liner can be disposed within the wellbore 102. A liner can be a casing string that does not extend to the top of the wellbore 102 and is anchored or suspended from inside the bottom of a previous casing string. The substantially horizontal section 106 extends through a hydrocarbon bearing subterranean formation 110.

A tubing string 112 extends from the surface within wellbore 102. The tubing string 112 can provide a conduit for formation fluids, such as production fluids produced from the subterranean formation 110, to travel from the substantially horizontal section 106 to the surface. Pressure from a bore in a subterranean formation can cause formation fluids, such as gas or petroleum, to flow to the surface. The rate of fluid flow can be controlled using one or more inflow control devices.

The supercapacitor device 114, depicted as a functional block in FIG. 1, can be positioned in the tubing string 112 at a vertical section 104 or at a horizontal section 106. In some aspects, a supercapacitor device can be deployed in simpler wellbores, such as wellbores having only a substantially vertical section.

Figure 2:
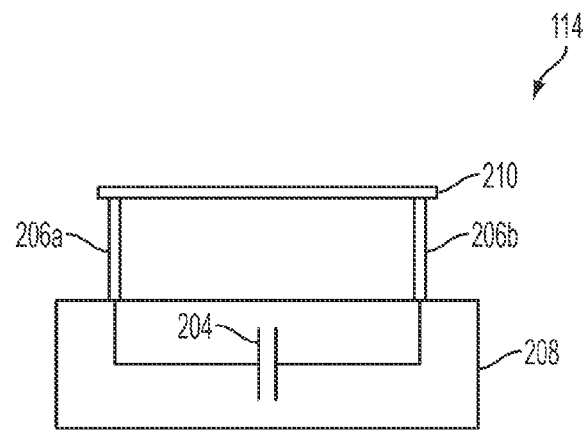
FIG. 2 is a cross-sectional view of a supercapacitor device that can be deployed in a well system according to one aspect of the present invention.

FIG. 2 is a cross-sectional view of a supercapacitor device 114 that can be deployed in a well system 100. The supercapacitor device 114 can include a supercapacitor 204, terminals 206a, 206b, and a body 208. The supercapacitor 204 can be disposed in the body 208. The terminals 206a, 206b can be electrically connected to the supercapacitor 204.

The supercapacitor 204 can be discharged by positioning the supercapacitor device 114 such that the terminals 206a, 206b contact a conductive material 210. The terminals 206a, 206b contacting the conductive material 210 can form an electrical path between the terminals 206a, 206b. The electrical path between the terminals 206a, 206b and the electrical connection between the terminals 206a, 206b and the supercapacitor 204 can discharge energy stored in the supercapacitor 204.

The supercapacitor device 114 can be discharged via any suitable conductive material 210. A non-limiting example of a suitable conductive material is a metal. The conductive material 210 can be a part of any tool, structure, or other object in the well system.

Figure 3:
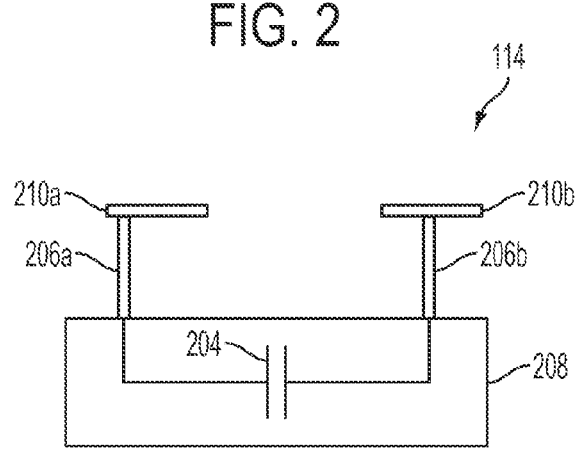
FIG. 3 is a cross-sectional view of a supercapacitor device melting a conductive material according to one aspect of the present invention.

In some aspects, discharging the supercapacitor 204 can cause sufficient heat to be generated in, or transferred to, the conductive material 210 such that the conductive material 210 melts. For example, FIG. 3 is a cross-sectional view of a supercapacitor device 114 melting a conductive material 210. The conductive material 210 can melt and separate into the conductive materials 210a, 210b.

Figure 4:
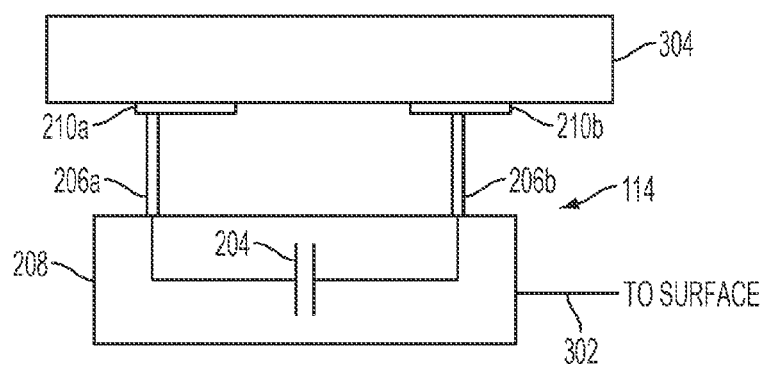
FIG. 4 is a cross-sectional view of a supercapacitor device deployed in a well system as a retrieval tool according to one aspect of the present invention.

In some aspects, the supercapacitor device 114 can be used as a retrieval tool in a well system 100. For example, FIG. 4 is a cross-sectional view of supercapacitor device 114 that is deployed in a well system 100 as a retrieval tool. The supercapacitor device 114 can be deployed into a well system 100 system via any suitable retrieval mechanism 302, such as (but not limited to) a control line or a wireline system. The supercapacitor device 114 can melt conductive material 210a, 210b that is in contact with an object 304 in the well system. The conductive material 210a, 210b can solidify after melting, thereby fusing the object 304 to the supercapacitor device 114 via the conductive material 210a, 210b. The supercapacitor device 114 coupled to the object 304 can be retrieved via the retrieval mechanism 302.

In some aspects, the conductive material 210a, 210b can be a part of the object 304. In other aspects, a conductive material 210 can be deployed with the supercapacitor device 114. For example, a downhole tool may include a conductive material that can be melted by energy discharged from the supercapacitor device 114. The conductive material 210 can be melted by discharging the supercapacitor device 114 after positioning the supercapacitor device 114 such that the conductive material is in contact with the object 304.

A supercapacitor device can include any suitable actuation mechanism for preventing a premature discharge of energy from the supercapacitor 204 during deployment into a wellbore. For example, FIGS. 5-6 are cross-sectional views of a supercapacitor device 114' that includes an actuation mechanism 404 for selectively displacing a non-conductive material 402 that prevents a premature discharge of energy from the supercapacitor device 114'.

Figure 5:
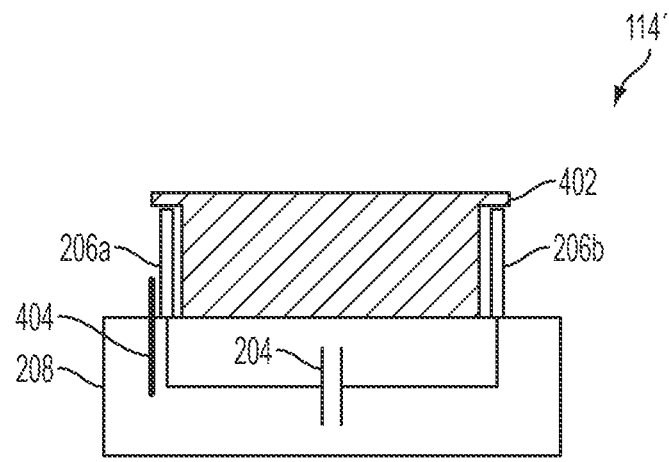
FIG. 5 is a cross-sectional view of a supercapacitor device including an actuation mechanism for selectively displacing a non-conductive material to prevent a prematurely discharging energy according to one aspect of the present invention.
Figure 6:
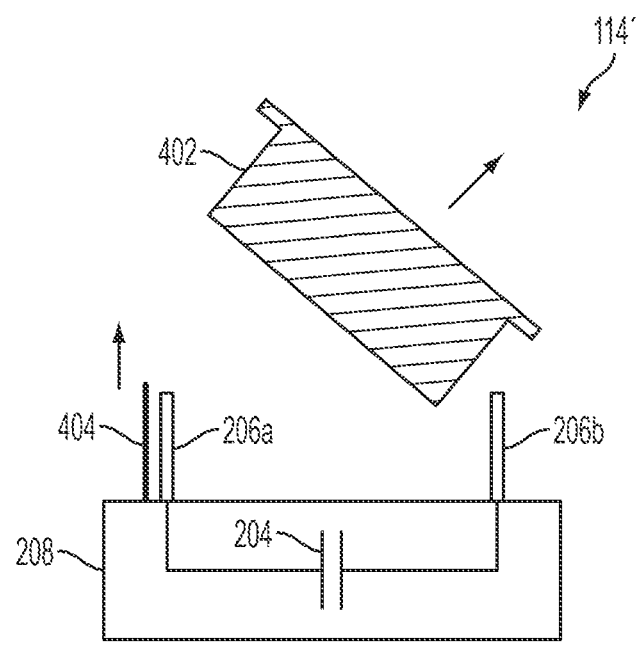
FIG. 6 is a cross-sectional view of a supercapacitor device including an actuation mechanism displacing the non-conductive material to allow a discharge of energy from the supercapacitor device according to one aspect of the present invention.

As depicted in FIG. 5, the supercapacitor device 114' can include the non-conductive material 402 and an actuation mechanism 404. The non-conductive material 402 can wholly or partially surround the terminals 206a, 206b. The non-conductive material 402 can be any suitable non-conductive material for preventing an electrical path from being formed between the terminals 206a, 206b. Non-limiting examples of a suitable non-conductive material can include rubber, plastic, glass, a dielectric fluid enclosed in a container, etc. The non-conductive material 402 can prevent a premature discharge of the supercapacitor device 114' as the supercapacitor device 114' is deployed downhole into the well system 100.

The non-conductive material 402 can be displaced after the supercapacitor device 114' is deployed to a desired position in the wellbore, such as a position in proximity to an object to be welded, cut, retrieved, or otherwise manipulated using the supercapacitor device 114'. The actuation mechanism 404 can apply a force to the non-conductive material 402. The force can displace the non-conductive material 402. For example, as depicted in FIG. 6, the actuation mechanism 404 can be extended in a direction away from the body 208. Extending the actuation mechanism 404 can apply a force to the non-conductive material 402 in the direction away from the body 208. Displacing the non-conductive material 402 can allow an electrical path to be formed between the terminals 206a, 206b.

The actuation mechanism 404 can be triggered via any suitable mechanism, such as an electrical or mechanical switch. The triggering of the actuation mechanism 404 can be provided via any suitable mechanism, such as (but not limited to) a control line or communication signal from a control unit at the surface.

Although FIGS. 5-6 depict an actuation mechanism 404 contacting one end of a non-conductive material 402 to displace a single non-conductive material 402, other implementations are possible. In additional or alternative aspects, a cap formed from a non-conductive material can be positioned over one or both of the terminals 206a, 206b. Each cap can be displaced via a respective actuation mechanism configured to apply a force to the cap.

Although FIGS. 5-6 depict an actuation mechanism 404 applying a force via contact with the non-conductive material 402, other implementations are possible. In additional or alternative aspects, an actuation mechanism can include a mechanism configured to communicate pressure to the non-conductive material 402, thereby displacing the non-conductive material 402. For example, the actuation mechanism can generate the force by mixing two chemicals to generate pressure. The actuation mechanism can be adapted to communicate the pressure to the non-conductive material 402. Communicating the pressure to the non-conductive material 402 can displace the non-conductive material 402.

Figure 7:
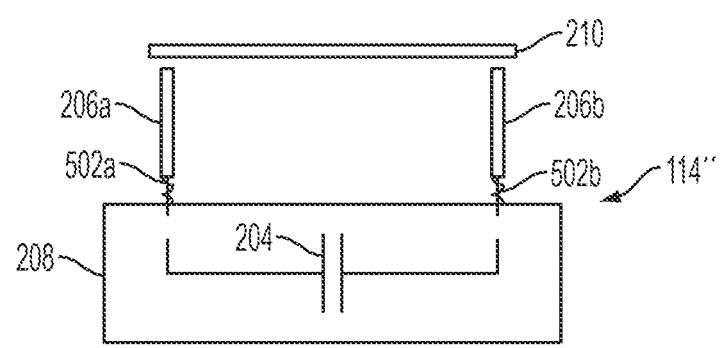
FIG. 7 is a cross-sectional view of a supercapacitor device including a spring-loaded actuation mechanism for selectively preventing at least one terminal from being electrically connected to the supercapacitor according to one aspect of the present invention.
Figure 8:
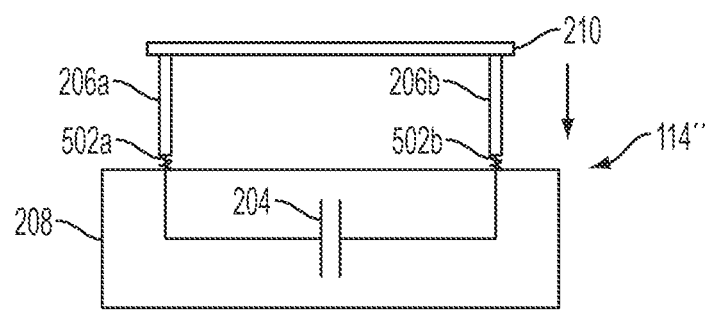
FIG. 8 is a cross-sectional view of a supercapacitor device including a spring-loaded actuation mechanism selectively allowing terminals to be electrically connected to a supercapacitor according to one aspect of the present invention.

In additional or alternative aspects, an actuation mechanism can prevent a premature discharge of the supercapacitor 204 by selectively preventing at least one terminal from being electrically connected to the supercapacitor 204. FIGS. 7-8 are cross-sectional views of a supercapacitor device 114" including an actuation mechanism for selectively preventing at least one terminal from being electrically connected to the supercapacitor 204. As depicted in FIG. 7, the supercapacitor device 114" can include retaining structures 502a, 502b coupled to or otherwise in contact with the terminals 206a, 206b. The retaining structures 502a, 502b can retain the terminals 206a, 206b in a position such that the terminals 206a, 206b are electrically disconnected from the supercapacitor 204, thereby preventing a discharge of the supercapacitor 204.

Applying force to the terminals 206a, 206b in the direction of the body 208 can cause the terminals 206a, 206b to move toward the body 208. The terminals 206a, 206b moving toward the body 208 can electrically couple the terminals 206a, 206b to the supercapacitor 204, thereby causing the supercapacitor 204 to discharge stored energy.

In some aspects, the retaining structures 502a, 502b can include compressible actuation mechanisms. The compressible actuation mechanisms can be compressed by the application of force to the terminals 206a, 206b in the direction of the body 208, thereby forming an electrical connection between the terminals 206a, 206b and the supercapacitor 204.

A compressible actuation mechanism can include any device, structure, or group of devices and structures that can store mechanical energy that can cause a force to be applied in a direction opposite to a compressing force. One non-limiting example of a compressible actuation mechanism is a device that includes a compression spring adapted to apply a force in a direction away from the body 208, as depicted in FIGS. 7-8. Another non-limiting example of a compressible actuation mechanism is a device that includes a metal band or other structure adapted to apply a force in a direction away from the body 208.

Figure 9:
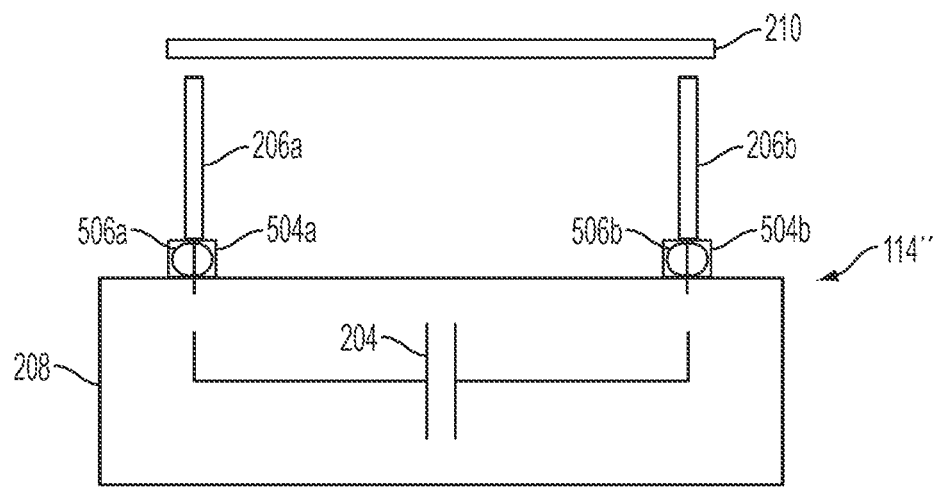
FIG. 9 is a cross-sectional view of a supercapacitor device including an actuation mechanism with a compressible fluid for selectively preventing at least one terminal from being electrically connected to the supercapacitor according to one aspect of the present invention.
Figure 10:
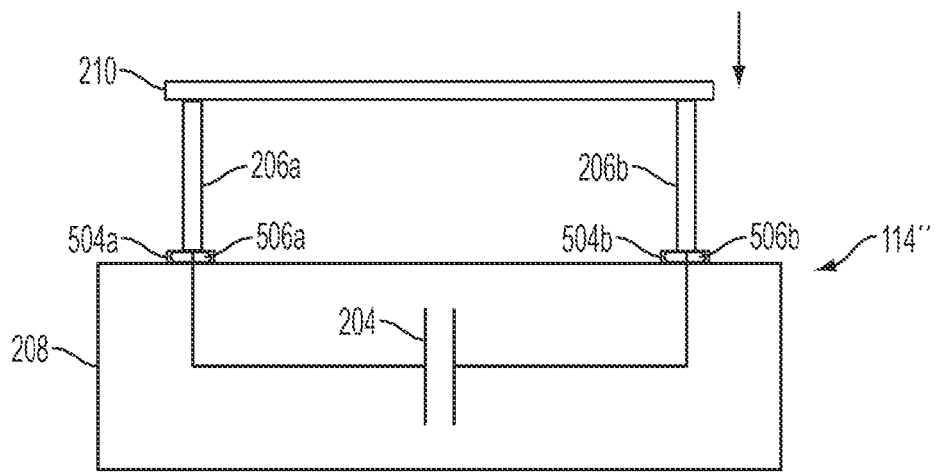
FIG. 10 is a cross-sectional view of a supercapacitor device including an actuation mechanism with a compressible fluid selectively allowing terminals to be electrically connected to a supercapacitor according to one aspect of the present invention.

Another non-limiting example of a compressible actuation mechanism is a chamber or other structure formed from a flexible material and having a compressible fluid contained in the chamber, as depicted in FIGS. 9-10. The supercapacitor device 114" can include containers 504a, 504b. Compressible fluids 506a, 506b can respectively be stored within inner volumes of the containers 504a, 504b. The containers 504a, 504b can be formed from any flexible material suitable for storing the compressible fluids 506a, 506b and for being deployed in the wellbore 102. Each of the compressible fluids 506a, 506b can provide a force to be applied to inner walls of the containers 504a, 504b. The force applied to the inner walls of the containers 504a, 504b can cause forces to be applied to the terminals 206a, 206b in directions away from the body 208. The application of force to the terminals 206a, 206b in a direction away from the body 208 can cause one or more of the terminals 206a, 206b to be electrically disconnected from the supercapacitor 204, as depicted in FIG. 9. The compressible fluids 506a, 506b can be compressed by an application of force to the terminals 206a, 206b in the direction of the compressible fluids 506a, 506b, as indicated by the downward arrow in FIG. 10. Compressing the compressible fluids 506a, 506b can cause the terminals 206a, 206b to be electrically connected to the supercapacitor 204.

Although FIGS. 7-10 depict each of the terminals 206a, 206b in a position that is electrically disconnected from the supercapacitor 204, other implementations are possible. In additional or alternative aspects, a single one of the terminals 206a, 206b can be positioned such that an electrical connection is not formed between the terminals 206a, 206b and the supercapacitor 204.

In additional or alternative aspects, the supercapacitor device can be actuated by a motor configured to electrically connect the terminals 206a, 206b and the supercapacitor 204. For example, FIGS. 11-14 are cross-sectional views of a supercapacitor device 114''' that can be actuated by a motor 510 controlled by a control device 508. For simplicity, FIGS. 11-14 depict the control device 508 and the motor 510 as functional blocks.

Figure 11:
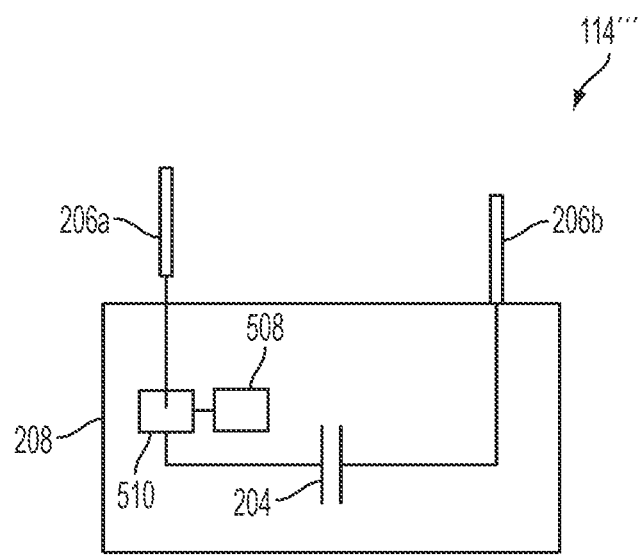
FIG. 11 is a cross-sectional view of a supercapacitor device having an actuation mechanism that includes a motor for selectively allowing at least one terminal from being electrically connected to the supercapacitor according to one aspect of the present invention.
Figure 12:
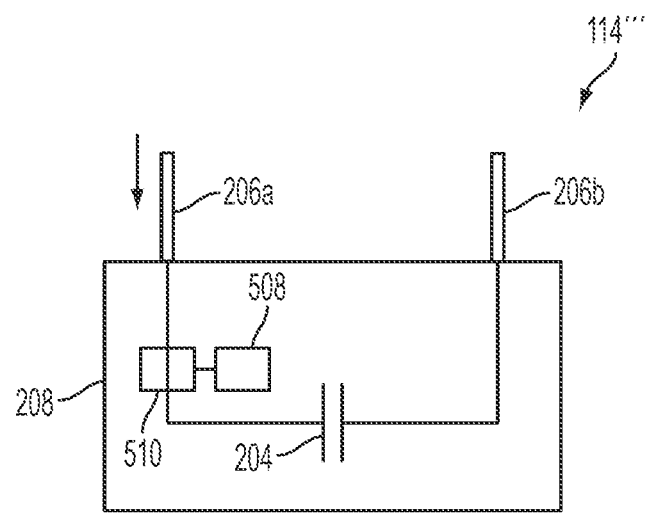
FIG. 12 is a cross-sectional view of a supercapacitor device having an actuation mechanism that includes a motor allowing the terminals of the supercapacitor device to be electrically connected to a supercapacitor according to one aspect of the present invention.
Figure 13:
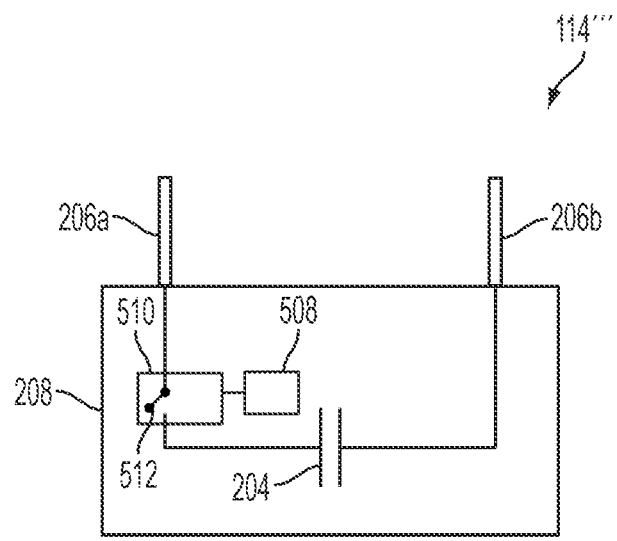
FIG. 13 is a cross-sectional view of a supercapacitor device having an actuation mechanism that includes a motor for selectively actuating a relay to electrically connect the terminals and the supercapacitor according to one aspect of the present invention.
Figure 14:
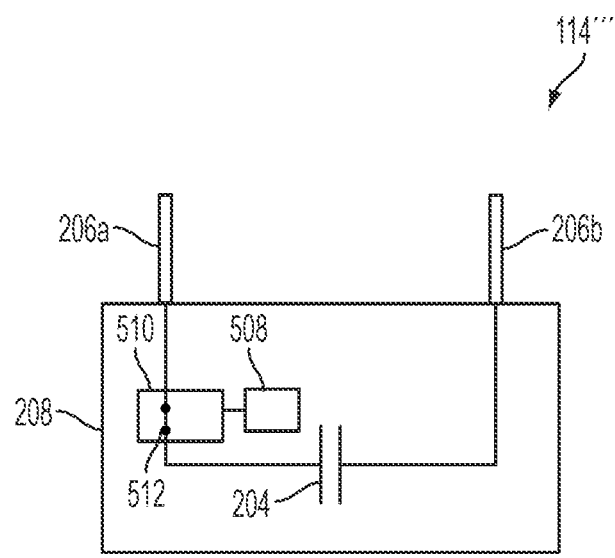
FIG. 14 is a cross-sectional view of a supercapacitor device having an actuation mechanism that includes a motor for actuating a relay to electrically connect the terminals and the supercapacitor according to one aspect of the present invention.

The control device 508 can be any electrical device suitable for activating the motor 510. Prior to activation of the motor 510, one or more of the terminals 206a, 206b can be electrically disconnected from the supercapacitor 204, as depicted in FIG. 11. Activating the motor 510 can cause one or more of the disconnected terminals 206a, 206b to be electrically connected to the supercapacitor 204. In one non-limiting example, the motor can change the position of one or more of the terminals 206a, 206b such that both terminals are electrically connected to the supercapacitor 204, as depicted by the downward arrow in FIG. 12. In another non-limiting example, a motor 510 or other suitable device can actuate one or more relays such that the one or more relays electrically connect one or more of the disconnected terminals 206a, 206b to the supercapacitor 204. FIGS. 13-14 are cross-sectional views of a supercapacitor device 114''' that can be actuated by the motor 510 and a relay 512. The relay 512 can be moved from an open position, as depicted in FIG. 13, to a closed position, as depicted in FIG. 14.

The control device 508 can be actuated by any suitable mechanism. In some aspects, a control signal for actuating the control device 508 can be communicated to the control device via wired or wireless communication. In other aspects, the control device 508 can be actuated by a force sensor, accelerometer, or other device can detect a sudden force or by measure the depth of the supercapacitor device 114". The control device 508 can activate the motor 510 in response to the force sensor or other device detecting that the supercapacitor device 114" is at a position in the wellbore 102 that exceeds a threshold depth. In other aspects, the control device 508 can be actuated by a pressure sensor that activates in response to sensing a threshold hydrostatic pressure.

In other aspects, the retaining structures 502a, 502b can include retaining pins than can be sheared or otherwise broken by the application of force to the terminals 206a, 206b in the direction of the body 208. Shearing the retaining pins can allow the terminals 206a, 206b to be moved toward the body 208, thereby forming an electrical connection between the terminals 206a, 206b and the supercapacitor 204.

Figure 15:
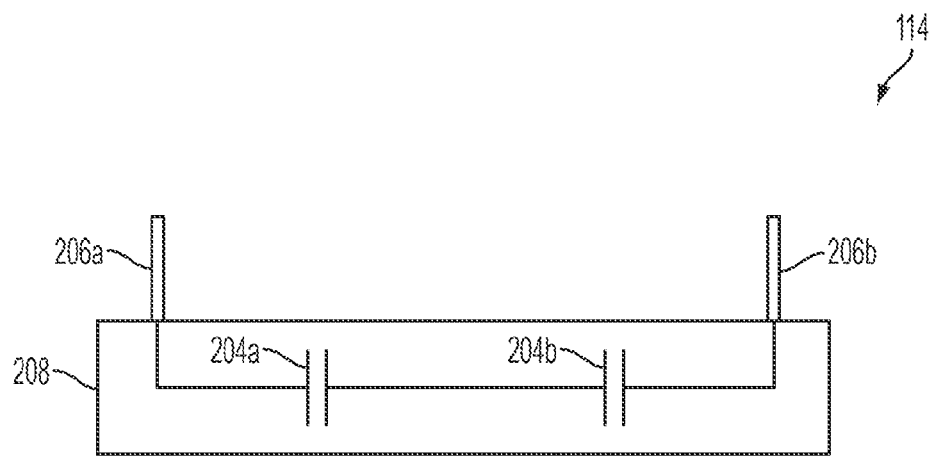
FIG. 15 is a cross-sectional view depicting multiple supercapacitors electrically connected in series with one another according to one aspect of the present invention.

Although FIGS. 2-14 depict a supercapacitor device having a single supercapacitor, other implementations are possible. For example, FIG. 15 is a cross-sectional view of a supercapacitor device 114 having multiple supercapacitors 204a, 204b electrically connected in series with one another. Any number of supercapacitors can be electrically connected in series with one another in a supercapacitor device 114. Electrically connecting multiple supercapacitors in series with one another can increase the voltage difference across the multiple supercapacitors. The terminals 206a, 206b can be electrically connected to the supercapacitors 204a, 204b in series with one another.

Figure 16:
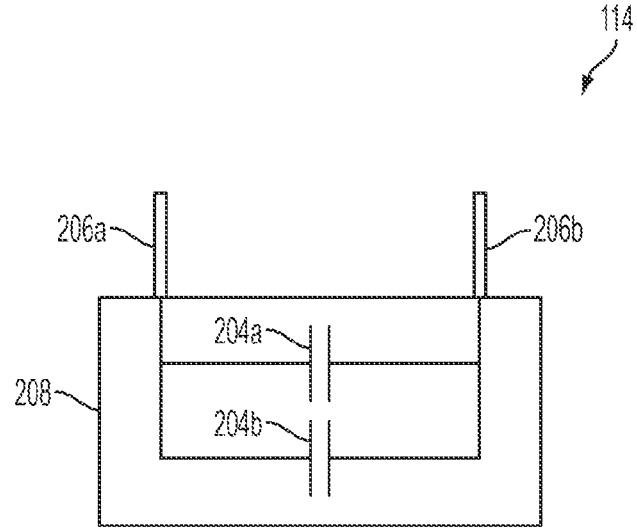
FIG. 16 is a cross-sectional view depicting multiple supercapacitors electrically connected in parallel with one another according to one aspect of the present invention.

In other aspects, multiple supercapacitors can be electrically connected in parallel with one another. FIG. 16 is a cross-sectional view of a supercapacitor device 114 having multiple supercapacitors 204a, 204b electrically connected in parallel with one another. Any number of supercapacitors can be electrically connected in parallel with one another in a supercapacitor device 114. Electrically connecting multiple supercapacitors in parallel with one another can increase the electrical current provided by discharging the multiple supercapacitors. The terminals 206a, 206b can be electrically connected to the supercapacitors 204a, 204b electrically connected in parallel with one another.

Figure 17:
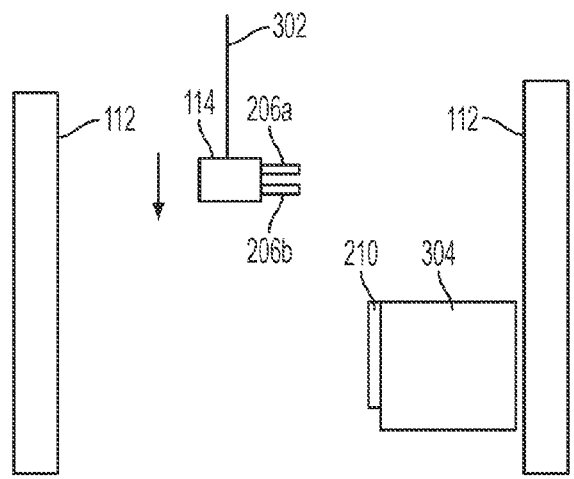
FIG. 17 is a cross-sectional view depicting a supercapacitor device being deployed into a well system according to one aspect of the present invention.
Figure 18:
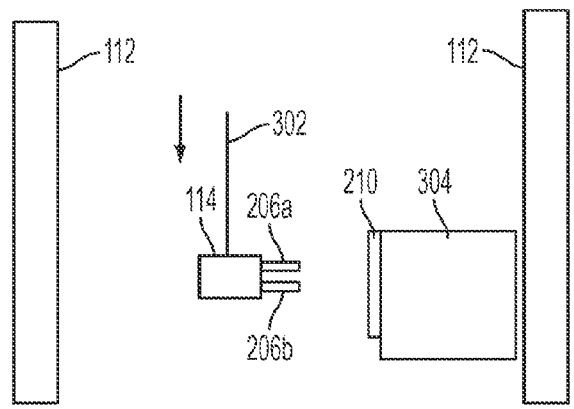
FIG. 18 is a cross-sectional view depicting a supercapacitor device positioned in proximity to an object in a well system according to one aspect of the present invention.
Figure 19:
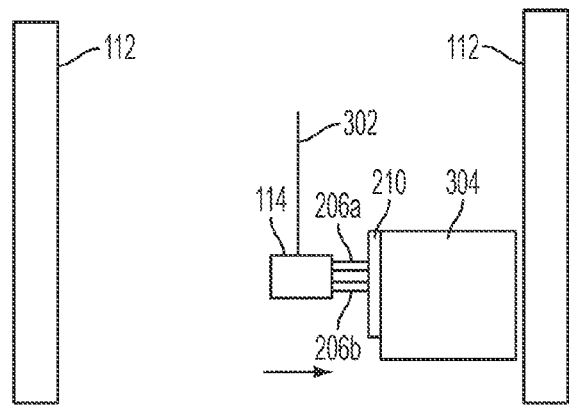
FIG. 19 is a cross-sectional view depicting a supercapacitor device being positioned in contact with a conductive material of an object in a well system according to one aspect of the present invention.

FIGS. 17-19 are cross-sectional views depicting a supercapacitor device 114 being deployed into a tubing string 112 of the well system 100. The supercapacitor device can be deployed into the tubing string 112 or another position in a wellbore 102 of the well system 100, as depicted by the downward arrows in FIGS. 17 and 18. The supercapacitor device 114 can be deployed into the tubing string 112 via any suitable mechanism 302, such as a wireline or a control line. The supercapacitor device 114 can be positioned in proximity to an object 304 that includes conductive material 210, as depicted in FIG. 18. The supercapacitor device 114 can be further positioned such that the terminals 206a, 206b contact the conductive material 210, as depicted in FIG. 19.

The energy stored in the supercapacitor device 114 can be discharged by actuating an actuation mechanism. In some aspects, the actuation mechanism can displace a non-conductive material 404 as depicted in FIGS. 5-6 prior to the terminals 206a, 206b contacting the conductive material 210. In other aspects, a force applied by the terminals 206a, 206b contacting the conductive material 210 can cause the terminals 206a, 206b to form an electrical connection with the supercapacitor 204, as depicted in FIGS. 7-8.

In additional or alternative aspects, the supercapacitor device 114 can cut, sever, or otherwise perforate pipe such as a section of the tubing string 112.

Figure 20:
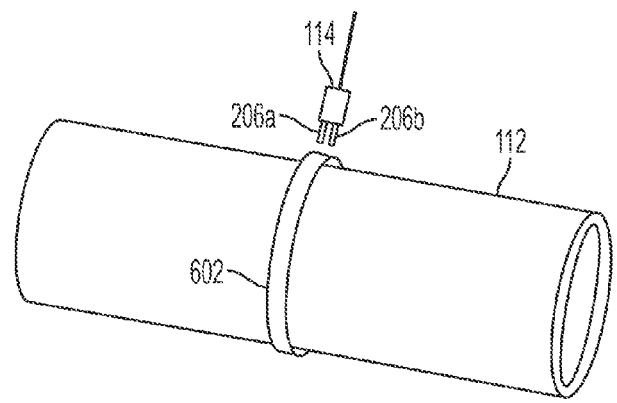
FIG. 20 is a perspective view of a section of a tubing string that can be severed by a supercapacitor device contacting a severing tool according to one aspect of the present invention.
Figure 21:
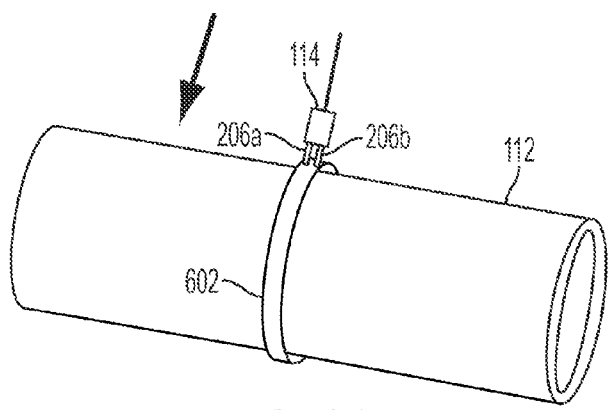
FIG. 21 is a perspective view of a supercapacitor device contacting a severing tool to sever a tubing string section according to one aspect of the present invention.
Figure 22:
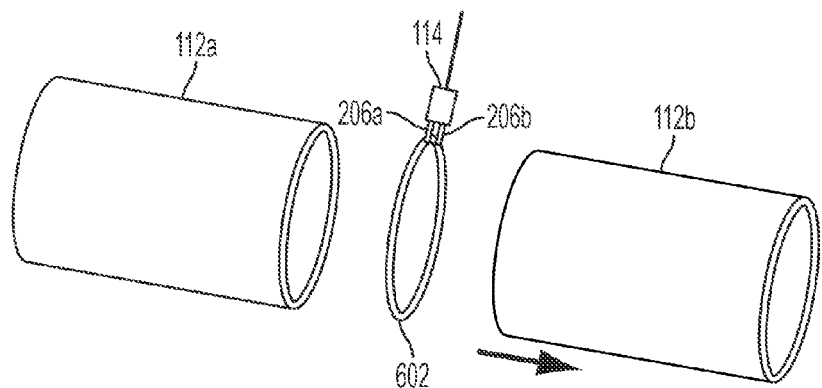
FIG. 22 is a perspective view of a section of the tubing string severed using a supercapacitor device according to one aspect of the present invention.

For example, FIGS. 20-22 are perspective views of a section of the tubing string 112 that can be severed by a supercapacitor device 114 contacting a severing tool 602. A tubing section that includes a malfunctioning, tubing-deployed downhole device may be severed from the tubing string 112 and retrieved.

As depicted in FIG. 20, a severing tool 602 can circumferentially surround a section of the tubing string 112. The severing tool 602 can be formed from any suitable conductive material. The supercapacitor device 114 can be positioned such that the supercapacitor device 114 contacts the severing tool 602, as depicted by the downward arrow in FIG. 21. The supercapacitor device 114 contacting the severing tool 602 can cause the supercapacitor 204 to discharge. Discharging the supercapacitor 204 can cause electrical current to flow through the severing tool 602. The electrical current flowing through the severing tool 602 can cause heat to be transferred to the tubing string 112 via the severing tool 602. The heat can be sufficient to cause the tubing string to sever into a tubing section 112a and a tubing section 112b, as depicted in FIG. 22.

In some aspects, the severing tool 602 can be formed from a conductive material with a higher melting temperature than the material forming the tubing string 112. The severing tool 602 can thus transfer heat to the tubing string 112 without melting. In other aspects, the severing tool 602 can be formed from a conductive material with a melting temperature equal to the melting temperature of the material forming the tubing string 112. The severing tool 602 can melt in the process of transferring heat to the tubing string 112.

Figure 23:
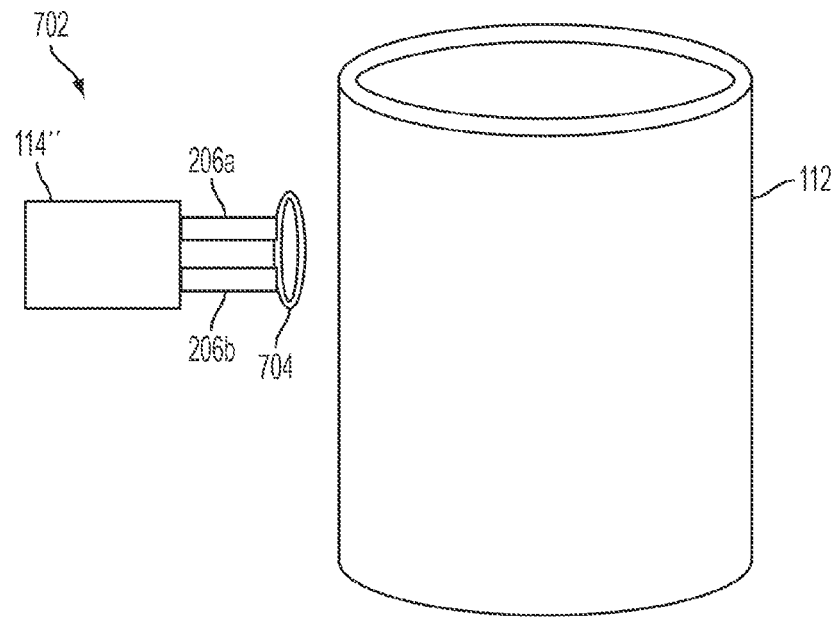
FIG. 23 is a perspective view of a supercapacitor cutting device for cutting a section of a tubing string according to one aspect of the present invention.
Figure 24:
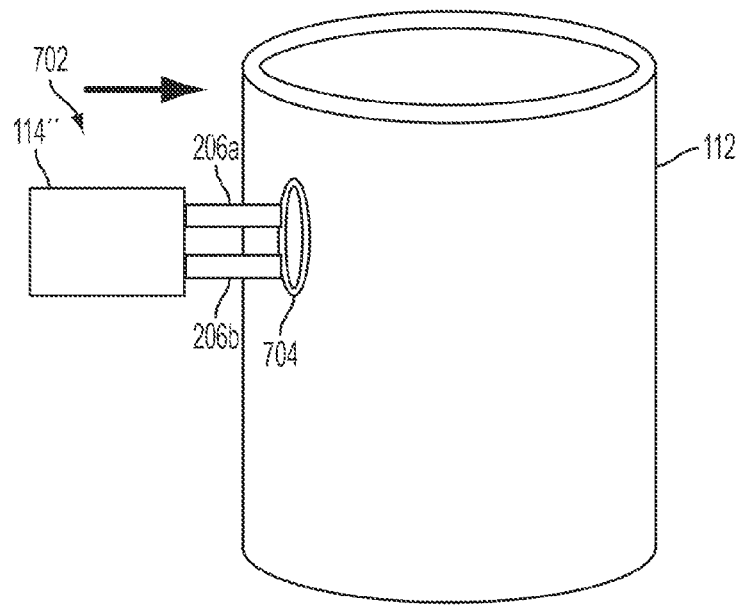
FIG. 24 is a perspective view of the supercapacitor cutting device cutting the section of the tubing string according to one aspect of the present invention.

In another example, the supercapacitor device can be used to perforate or otherwise cut a hole in a section of the tubing string 112. FIGS. 23-24 are perspective views of a section of the tubing string 112 that can be cut by a supercapacitor cutting device 702. As depicted in FIG. 23, the supercapacitor cutting device 702 can include a supercapacitor device 114" having a cutting structure 704 electrical coupled to the terminals 206a, 206b. The supercapacitor cutting device 702 can be positioned such that the cutting structure 704 contacts a section of the tubing string 112, as depicted by the rightward arrow in FIG. 24. The cutting structure 704 contacting the section of the tubing string 112 can apply a force to the terminals 206a, 206b in the direction of the body 208 as described above with respect to FIGS. 7-8, thereby causing the supercapacitor device 114" to discharge. Discharging the supercapacitor device 114" can cause electrical current to flow through the cutting structure 704. The electrical current flowing through the cutting structure 704 that is in contact with the tubing string 112 can cause heat to be transferred to the tubing string 112. The heat transferred to the tubing string 112 can be sufficient to cut an opening in the tubing string 112 in the shape of the cutting structure 704.

The cutting structure 704 can be formed from any suitable conductive material. In some aspects, the conductive material of the cutting structure 704 can have a melting point higher than that of the material from which the tubing string 112 is formed, such that the cutting structure 704 can transfer heat to the tubing string 112 without melting the cutting structure 704. In other aspects, the cutting structure 704 can be melted by transferring heat to the tubing string 112.

Figure 25:
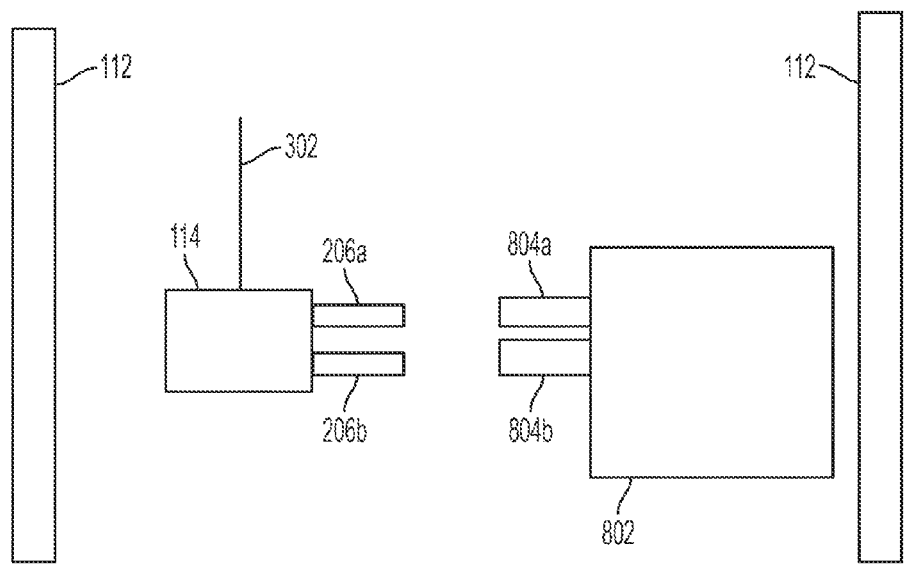
FIG. 25 is a cross-sectional view of a battery disposed in a tubing string that can be recharged by a supercapacitor device according to one aspect of the present invention.
Figure 26:
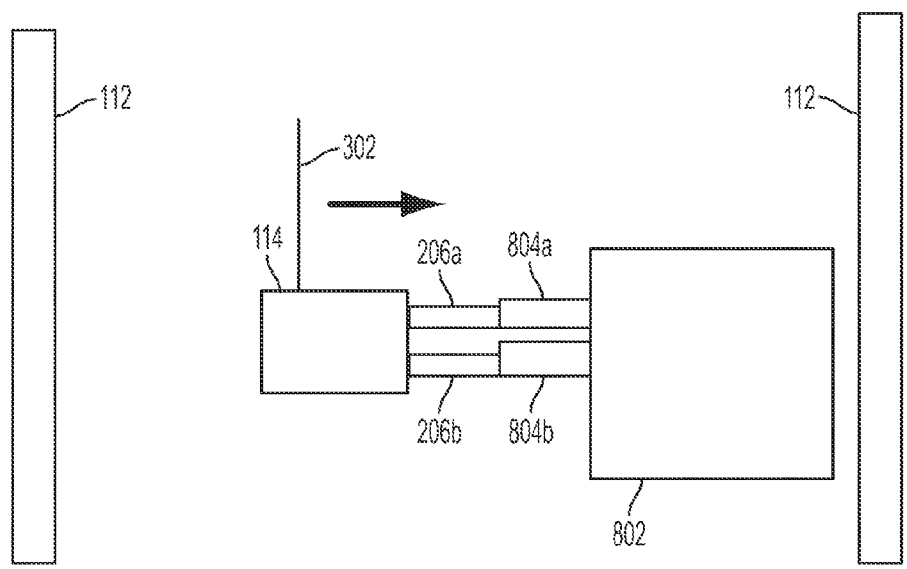
FIG. 26 is a cross-sectional view of a supercapacitor device recharging a battery according to one aspect of the present invention.

In additional or alternative aspects, the supercapacitor device 114 can be used to charge or recharge an electrical tool downhole. FIGS. 25-26 are cross-sectional views of a battery 802 disposed in the tubing string 112 that can be recharged by a supercapacitor device 114. The battery 802 can include terminals 804a, 804b. The terminals 804a, 804b can be adapted to form an electrical connection with the terminals 206a, 206b of the supercapacitor device 114. As depicted in FIG. 25, the supercapacitor device 114 can be deployed into the tubing string 112 via a retrieval mechanism 302 or other suitable mechanism. The supercapacitor device 114 can be positioned such that the terminals 206a, 206b form an electrical connection with the terminals 804a, 804b, as depicted by the rightward arrow in FIG. 26. The supercapacitor 204 of the supercapacitor device 114 can be discharged as the terminals 206a, 206b are electrically connected with the terminals 804a, 804b. Discharging the supercapacitor device 114 can cause an electrical current to flow from the supercapacitor device 114 to the battery 802 via the terminals 804a, 804b. The electrical current flowing into the battery 802 via the terminals 804a, 804b can charge the battery 802.

Figure 27:
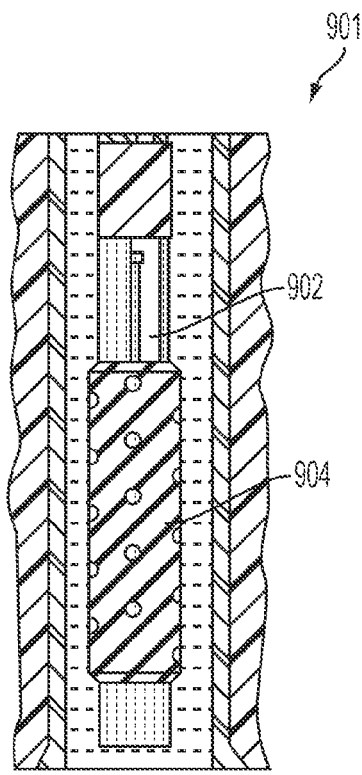
FIG. 27 is a cross-sectional view of a tool string including a firing head assembly in which a supercapacitor device can be disposed according to one aspect of the present invention.

In additional or alternative aspects, the supercapacitor device 114 can be used to activate one or more perforating guns used to perforate a pipe in a well system 100. FIG. 27 is a cross-sectional view of a tool string 901 including a firing head assembly 902 in which a supercapacitor device 114 can be disposed. The tool string 901 can include the firing head assembly 902 and a gun assembly 904. The gun assembly 904 can be a device, such as one or more perforating guns, for perforating the tubing string 112 in preparation for production of fluid from the formation 110.

Figure 28:
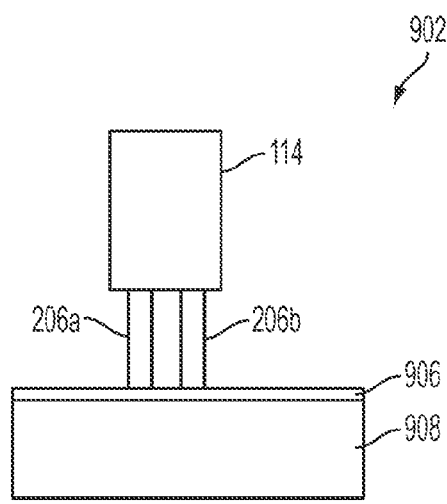
FIG. 28 is a cross-sectional view of firing head assembly including a supercapacitor device according to one aspect of the present invention.

FIG. 28 is a cross-sectional view of an example firing head assembly 902 that includes the supercapacitor device 114 according to one aspect. The firing head assembly 902 can include a detonating cap 906 in contact with a detonating material 908. The detonating material 908 can be any substance adapted to generate or otherwise provide an explosive force in response to the transfer of heat to the detonating material 908 or the flow of electrical current through the detonating material 908. The detonating cap 906 can be a conductive material. The supercapacitor device 114 can be discharged by contact with the detonating cap 906. Discharging the supercapacitor device 114 can cause electrical current to flow through and/or heat to be transferred to the detonating material 908 via the detonating cap 906. Electrical current flowing through and/or heat being transferred to the detonating material 908 can cause the detonating material 908 to detonate. Detonating the detonating material 908 can cause the gun assembly 904 to perforate the casing string 108 or a liner disposed in the wellbore 102, thereby allowing the flow of fluid from the formation 110 into the tubing string 112.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A supercapacitor device configured to be disposed in a wellbore through a fluid-producing formation, the supercapacitor device comprising:
    a body configured to be disposed in the wellbore;
    a supercapacitor disposed in the body and configured to store energy;
    at least two terminals disposed at least partially outside the body, the at least two terminals configured to be electrically connected with the supercapacitor, wherein an electrical connection between the supercapacitor and the at least two terminals is adapted to cause the energy to be discharged from the supercapacitor in response to a conductive material providing an electrical path between the at least two terminals; and
    an actuation mechanism configured to selectively prevent discharge of the energy from the supercapacitor when the supercapacitor device is deployed into the wellbore, wherein the actuation mechanism comprises:
        a motor configured to selectively cause at least one terminal to be electrically disconnected from the supercapacitor; and
        a control device configured to actuate the motor such that the at least one terminal is electrically connected to the supercapacitor.

2. The supercapacitor device of claim 1, further comprising a control line coupled to a control unit at the surface of the wellbore, wherein the actuation mechanism is configured to be actuated by the control line such that the actuation mechanism allows the electrical path to be formed between the at least two terminals.

3. The supercapacitor device of claim 1, wherein the control device is configured to actuate the motor in response to a control signal.

4. The supercapacitor device of claim 1, wherein the control device comprises a force sensor configured to determine a depth of the supercapacitor device, wherein the control device is configured to actuate the motor in response to the depth exceeding a threshold depth.

5. The supercapacitor device of claim 1, wherein the control device comprises a pressure sensor configured to determine a pressure in the wellbore, wherein the control device is configured to actuate the motor in response to the pressure exceeding a threshold pressure.

6. The supercapacitor device of claim 1, further comprising at least one additional supercapacitor electrically connected in parallel with the supercapacitor, wherein the at least two terminals are further configured to be electrically connected with the supercapacitor and the at least one additional supercapacitor electrically connected in parallel.

7. The supercapacitor device of claim 1, further comprising at least one additional supercapacitor electrically connected in series with the supercapacitor, wherein the at least two terminals are further configured to be electrically connected with the supercapacitor and the at least one additional supercapacitor electrically connected in series.

8. The supercapacitor device of claim 1,
    wherein the conductive material is coupled to a detonating material, the detonating material configured to detonate in response to an application of heat or a flow of an electrical current;
    wherein the supercapacitor device is configured to provide the heat or the electrical current to the detonating material.

9. The supercapacitor device of claim 1, wherein the at least two terminals are further configured to form the electrical connection with a battery in the wellbore, the battery comprising the conductive material, wherein the supercapacitor device is configured to charge the battery via the electrical connection.

10. The supercapacitor device of claim 1, wherein the actuation mechanism further comprises at least one non-conductive material, the at least one non-conductive material adapted to surround at least one of the at least two terminals, wherein the actuation mechanism is further configured to selectively allow the electrical path to be formed between the at least two terminals by displacing the at least one non-conductive material.

11. A supercapacitor device configured to be disposed in a wellbore through a fluid-producing formation, the supercapacitor device comprising:
    a body configured to be disposed in the wellbore;
    a supercapacitor disposed in the body and configured to store energy;
    at least two terminals disposed at least partially outside the body, the at least two terminals configured to be electrically connected with the supercapacitor, wherein an electrical connection between the supercapacitor and the at least two terminals is adapted to cause the energy to be discharged from the supercapacitor in response to a conductive material providing an electrical path between the at least two terminals; and
    an actuation mechanism configured to selectively prevent discharge of the energy from the supercapacitor when the supercapacitor device is deployed into the wellbore, wherein the actuation mechanism comprises at least one non-conductive material, the at least one non-conductive material adapted to surround at least one terminal, wherein the actuation mechanism is configured to selectively allow the electrical path to be formed between the at least two terminals by displacing the at least one non-conductive material; and
    a sensor configured to determine at least one of a depth of the supercapacitor device and a pressure in the wellbore, wherein the actuation mechanism is configured to selectively allow the electrical path to be formed between the at least two terminals in response to at least one of (i) the depth exceeding a threshold depth and (ii) the pressure exceeding a threshold pressure.

12. The supercapacitor device of claim 11, wherein the actuation mechanism further comprises:
    a motor configured to selectively cause at least one of the at least two terminals to be electrically disconnected from the supercapacitor; and
    the control device configured to actuate the motor such that the at least one of the at least two terminals is electrically connected to the supercapacitor.

13. The supercapacitor device of claim 11, further comprising at least one additional supercapacitor electrically connected in parallel with the supercapacitor, wherein the at least two terminals are further configured to be electrically connected with the supercapacitor and the at least one additional supercapacitor electrically connected in parallel.

14. The supercapacitor device of claim 11, further comprising at least one additional supercapacitor electrically connected in series with the supercapacitor, wherein the at least two terminals are further configured to be electrically connected with the supercapacitor and the at least one additional supercapacitor electrically connected in series.

15. The supercapacitor device of claim 11,
wherein the conductive material is coupled to a detonating material, the detonating material configured to detonate in response to an application of heat or a flow of an electrical current;
wherein the supercapacitor device is configured to provide the heat or the electrical current to the detonating material.

16. The supercapacitor device of claim 11, wherein the at least two terminals are further configured to form the electrical connection with a battery in the wellbore, the battery comprising the conductive material, wherein the supercapacitor device is configured to charge the battery via the electrical connection.

17. A method comprising:
deploying a supercapacitor device in a wellbore through a fluid-producing formation, the supercapacitor device comprising:
a supercapacitor configured to store energy,
at least two terminals, and
an actuation mechanism configured to selectively prevent a deployment of the supercapacitor device in the wellbore from causing a discharge of the energy from the supercapacitor, wherein the actuation mechanism includes a motor that selectively causes at least one terminal to be disconnected from the supercapacitor;
positioning the supercapacitor device such that the at least two terminals are in contact with a conductive material in the wellbore;
discharging the energy from the supercapacitor by actuating the actuation mechanism, wherein actuating the actuation mechanism comprises electrically connecting the at least one terminal to the supercapacitor.

18. The method of claim 17, further comprising:
melting the conductive material by discharging the energy from the supercapacitor;
coupling an object in the wellbore to the supercapacitor device via the conductive material; and
retrieving the supercapacitor device coupled to the object.

19. The method of claim 17, further comprising perforating an object in the wellbore by transferring heat to the object via the conductive material, wherein the heat is generated by discharging the energy from the supercapacitor.

20. The method of claim 17, further comprising coupling the conductive material to a detonating material configured to detonate in response to an application of heat or a flow of an electrical current, the detonating material configured to actuate a firing head assembly;
providing the heat or the electrical current to the conductive material by discharging the energy from the supercapacitor;
detonating the detonating material by providing the heat or the electrical current to the detonating material via the conductive material; and
perforating a tubing section in the wellbore by the firing head assembly.

* * * * *